United States Patent
Bolz

(10) Patent No.: US 8,129,981 B2
(45) Date of Patent: Mar. 6, 2012

(54) APPARATUS FOR DETECTING A FAULT IN THE BALANCING UNIT

(75) Inventor: Stephan Bolz, Pfatter (DE)

(73) Assignee: Continental Automotive GmbH, Hanover (DE)

( * ) Notice: Subject to any disclaimer, the term of this patent is extended or adjusted under 35 U.S.C. 154(b) by 258 days.

(21) Appl. No.: 12/522,550

(22) PCT Filed: Jan. 2, 2008

(86) PCT No.: PCT/EP2008/050010
§ 371 (c)(1),
(2), (4) Date: Jul. 9, 2009

(87) PCT Pub. No.: WO2008/084002
PCT Pub. Date: Jul. 17, 2008

(65) Prior Publication Data
US 2010/0219809 A1    Sep. 2, 2010

(30) Foreign Application Priority Data
Jan. 9, 2007   (DE) .......................... 10 2007 001 413

(51) Int. Cl.
*G01R 17/02*   (2006.01)
*G01R 1/20*    (2006.01)
*G01R 15/20*   (2006.01)

(52) U.S. Cl. ........................ 324/98; 324/126; 324/117 H

(58) Field of Classification Search ............ 324/762.01–762.09, 126, 127, 117 R, 545–547, 76.52, 324/509, 207.19, 510, 226, 98; 361/42, 36, 361/63
See application file for complete search history.

(56) References Cited

U.S. PATENT DOCUMENTS

| 3,068,411 | A  | * | 12/1962 | Galman ........................ 324/142 |
| 5,777,468 | A  | * | 7/1998  | Maher ....................... 324/207.18 |
| 7,723,996 | B2 | * | 5/2010  | Lee et al. ....................... 324/537 |
| 7,830,102 | B2 | * | 11/2010 | Huang et al. .................. 315/307 |
| 7,949,056 | B2 |   | 5/2011  | Yamashita et al. |
| 2006/0187004 | A1 | | 8/2006 | Vollmer et al. |

FOREIGN PATENT DOCUMENTS
WO   2005008911 A1   1/2005
WO   2005101684 A1   10/2005

* cited by examiner

*Primary Examiner* — Huy Q Phan
*Assistant Examiner* — Tung X Nguyen
(74) *Attorney, Agent, or Firm* — Laurence A. Greenberg; Werner H. Stemer; Ralph E. Locher

(57) ABSTRACT

An apparatus can be coupled to at least two lines for transmitting a differential signal, which is substantially symmetrical to a predefined reference potential, and/or for receiving such a differential signal. The apparatus includes a balancing unit, which can be coupled to the at least two lines and which includes a center tap. A monitoring unit is coupled to the center tap on the input side and is configured such that it monitors a center tap voltage between the center tap and the predefined reference potential and detects errors if the center tap voltage is greater than a predefined threshold value.

2 Claims, 1 Drawing Sheet

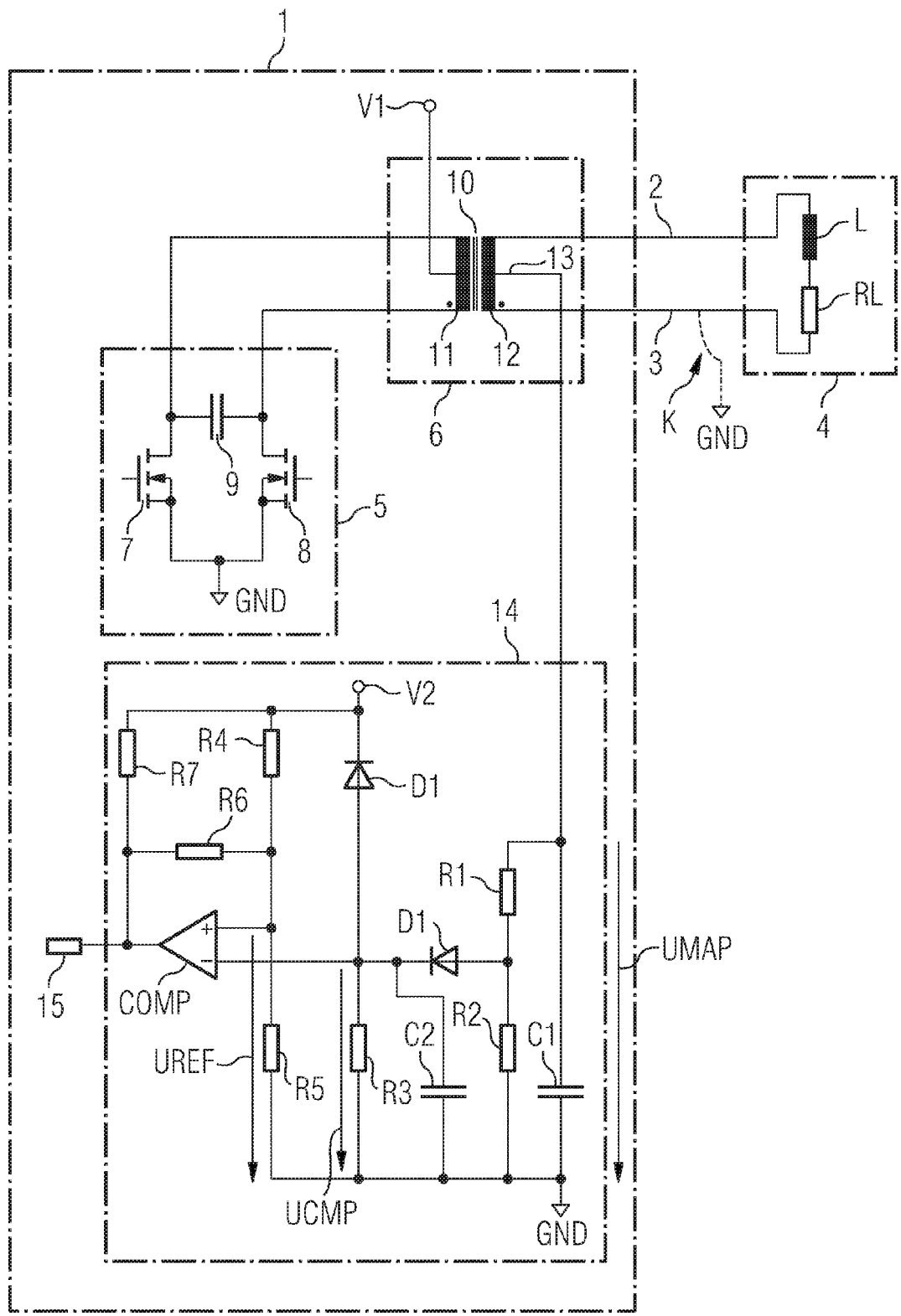

APPARATUS FOR DETECTING A FAULT IN THE BALANCING UNIT

BACKGROUND OF THE INVENTION

Field of the Invention

The invention relates to an apparatus which can be coupled to at least two lines for the purpose of transmitting a differential signal which is substantially symmetrical to a predefined reference potential, and/or for the purpose of receiving such a differential signal.

High-frequency signals with large voltage amplitudes can cause problems in terms of their electromagnetic compatibility, or EMC for short. This applies in particular in motor vehicles. For example, electromagnetic radiation is subject to severe restrictions in a frequency range between 150 kHz and 25 MHz, corresponding to the AM band, with the long, medium and short wave bands provided therein. For example, a limit value of 30 dB$\mu$V/m is provided in the cited frequency range for the electromagnetic radiation in a motor vehicle in which an electrical load is electrically coupled via a cable harness to a control device and by means of the latter is supplied via the cable harness with electrical energy in the form of the high-frequency signal. The transmitted electrical power lies in the region of about 200 watts, for example. A further difficulty is that faults, for example a short-circuit in the cable harness and in particular a short-circuit to a ground potential, must be detected in order to enable simple, cost-effective and swift rectification of the fault, in order to be able to guarantee the safety of the vehicle occupants, and in order to be able to ensure reliable operation of the motor vehicle.

BRIEF SUMMARY OF THE INVENTION

The object of the invention is to provide an apparatus which allows reliable detection of a fault on lines for differential signal transmission.

The object is achieved by means of the features of the independent claims. Advantageous developments of the invention are characterized in the dependent claims.

The invention is characterized by an apparatus which can be coupled to at least two lines for the purpose of transmitting a differential signal which is substantially symmetrical to a predefined reference potential, and/or for the purpose of receiving such a differential signal. The apparatus includes a balancing unit which can be coupled to the at least two lines and which has a center tap. The apparatus further comprises a monitoring unit which is coupled to the center tap on the input side and which is embodied for monitoring a center tap voltage between the center tap and the predefined reference potential and for detecting a fault if the center tap voltage is greater than a predefined threshold value.

The invention is based on the knowledge that it is advantageous to transmit a signal, in particular a high-frequency signal having a large voltage amplitude, differentially such that the signal is substantially symmetrical in relation to the predefined reference potential, which corresponds in particular to a ground potential. As a result there is only a small amount of electromagnetic radiation and predefined limit values in relation to the electromagnetic radiation can be reliably complied with. Furthermore, the signal can also be reliably transmitted or received if there is a fault, in particular in the event of a short-circuit of one of the at least two lines to the predefined reference potential. Owing to the monitoring of the center tap voltage, however, the fault, in particular the one-sided short-circuit to the predefined reference potential, can be reliably detected. In general, symmetry errors of the differentially transmitted or received signal in relation to the predefined reference potential can be easily and reliably detected if the symmetry error is so great that the center tap voltage is greater than the predefined threshold value.

The invention is particularly suitable for transmitting electrical energy via the at least two lines in the form of the differential signal for operating an electrical load, for example for operating a heater, in particular an inductive heater of a fuel injection valve in a motor vehicle.

In an advantageous embodiment the center tap is electrically coupled to the predefined reference potential via at least one resistor. This has the advantage that as a result of the coupling of the center tap to the predefined reference potential an influence of unilaterally acting, parasitic capacitances can be reduced or suppressed so that the symmetry of the differential signal in relation to the predefined reference potential is permanently and reliably maintained. Furthermore the electromagnetic radiation is also permanently low as a result.

In a further advantageous embodiment the monitoring unit comprises a voltage divider, a rectifier and a comparator. The voltage divider is arranged electrically between the center tap and the predefined reference potential. The rectifier is coupled to the voltage divider. The comparator is coupled to the rectifier on the input side. The comparator is furthermore embodied for comparing the divided-down and rectified center tap voltage with a reference voltage representing the predefined threshold value and providing on the output side an error signal which indicates the fault. The voltage divider forms in particular the at least one resistor which electrically couples the center tap to the predefined reference potential. The advantage is that the monitoring unit is very simple and can reliably detect the fault.

BRIEF DESCRIPTION OF THE DRAWING

Exemplary embodiments of the invention are explained below with reference to the schematic drawings.

DESCRIPTION OF THE INVENTION

The single FIGURE shows an apparatus 1 which is coupled via a first line 2 and a second line 3 to a load 4, that is to say to an electrical consumer. The apparatus 1 is, for example, a control device in a motor vehicle and the first and second line 2, 3 are routed in a cable harness of the motor vehicle, for example. The apparatus 1 is embodied for generating a high-frequency, preferably sinusoidal alternating voltage with a high voltage amplitude and for supplying same to the load 4 via the first and second line 2, 3. For example, a frequency of the alternating voltage equals about 45 kHz and the voltage amplitude equals about 140 V between maximum and minimum of the signal waveform within an oscillation period. In this way, for example, a power output in region of approx. 200 watts is transmitted from the apparatus 1 to the load 4.

Although the frequency of the alternating voltage, at approx. 45 kHz, is below an AM band that extends from 150 kHz to 25 MHz, harmonic waves of the alternating voltage can lie in this frequency range. A factor which can be critical in this instance is, for example, a third harmonic wave having a frequency of approx. 135 kHz, which comes very close to the AM band and can be shifted further in the direction of the AM band as a result of tolerances.

The load 4 is, for example, an inductively heatable fuel injection valve. However, the frequency of the alternating voltage, the voltage amplitude and/or the transmitted power can also be greater or less. Moreover, the apparatus 1 can also be operated with a different load 4. Furthermore, the apparatus 1 can also be embodied as an electrical load which can be supplied with electrical energy in the form of the signal via the first and second line 2, 3. The apparatus 1 is then embodied for receiving the signal supplied to it.

The apparatus 1 comprises an oscillator unit 5 and a balancing unit 6 for generating the signal. The balancing unit 6 is coupled to the first and second line 2, 3 and is embodied for balancing the signal in relation to a predefined reference potential GND. The signal transmitted over the first and second line 2, 3 is therefore substantially symmetrical in relation to the predefined reference potential GND. The signal is thus transmitted differentially. This is particularly favorable in relation to an electromagnetic radiation which can occur to a disruptive extent in particular in connection with high-frequency signals with a large voltage amplitude and can possibly interfere with other electrical components. The predefined reference potential GND is in particular a ground potential, for example the potential of a chassis of a motor vehicle.

The oscillator unit 5 preferably includes a power oscillator. The oscillator unit 5 comprises a first transistor 7 and a second transistor 8, which are preferably embodied as power transistors. A respective source terminal of the first and second transistor 7, 8 is coupled to the predefined reference potential GND. A respective drain terminal of the first and second transistor 7, 8 is coupled in each case to a terminal of an oscillator capacitor 9. The oscillator unit 5 is also embodied such that a respective gate terminal of the first and second transistor 7, 8 is driven alternately.

The balancing unit comprises a transformer 10 having a primary winding 11 and a secondary winding 12. The primary winding 11 is arranged electrically in parallel with the oscillator capacitor 9 and is also coupled to a first predefined supply potential V1. A voltage between the first predefined supply potential V1 and the predefined reference potential GND equals approx. twelve volts, for example. Said voltage can also be greater or less than twelve volts, however.

The secondary winding 12 is coupled to the first and second line 2, 3. The load 4 comprises for example a load inductor L and a load resistor RL, which are arranged electrically in series. The load inductor L and the load resistor RL form a circuit with the secondary winding 12 and the first and second line 2, 3.

The frequency of the differential signal which can be transmitted via the first and second line 2, 3 is substantially predefined by a capacitance value of the oscillator capacitor 9 and by an inductance value of the load inductance L transformed by the transformer 10.

If a fault occurs, in particular a short-circuit K either of the first or second line 2, 3 to the predefined reference potential GND, the symmetry of the signal in relation to the predefined reference potential GND can be lost. For example, the short-circuit K occurs between the second line 3 and the predefined reference potential GND, as shown in the FIGURE. The transmission of the signal from the apparatus 1 to the load 4 is not adversely affected as a result. However, the transmitted signal is no longer symmetrical in relation to the predefined reference potential GND. Consequently, the positive and negative components of the signal that are to be transmitted on the first and second line in relation to the predefined reference potential GND no longer mutually compensate one another. The electromagnetic radiation can be substantially increased as a result. A further consequence can be that possibly predefined limit values in relation to the electromagnetic radiation can no longer be adhered to. This fault, that is to say the short-circuit K, must therefore be detected so that it can be rectified.

For that purpose the secondary winding 12 of the balancing unit 6 includes a center tap 13 and the apparatus 1 comprises a monitoring unit 14 which is coupled to the center tap 13 on the input side. The monitoring unit 14 comprises a first voltage divider resistor R1 and a second voltage divider resistor R2 which are arranged electrically in series and which form a voltage divider. A capacitor C1 is arranged electrically in parallel with the voltage divider. The center tap 13 is coupled electrically to the predefined reference potential GND via the voltage divider and the capacitor C1. A center tap voltage UMAP drops between the center tap 13 and the predefined reference potential GND, i.e. via the voltage divider and the capacitor C1.

The monitoring unit 14 also comprises a rectifier which is formed by means of a rectifier diode D1. The rectifier is coupled to a tap of the voltage divider on the input side. The center tap voltage UMAP is divided down by means of the voltage divider as a function of a resistance value of the first voltage divider resistor R1 and a resistance value of the second voltage divider resistor R2 and supplied to the rectifier diode D1 at its anode terminal. Also provided are a smoothing capacitor C2 and a discharging resistor R3, which are arranged electrically parallel to each other and which are also arranged such that they electrically couple a cathode terminal of the rectifier diode D1 to the predefined reference potential GND. The cathode terminal of the rectifier diode D1 is also coupled to a second predefined supply potential V2 via a voltage limiting diode D2. A voltage of the second predefined supply potential V2 in relation to the predefined reference potential GND amounts to about five volts, for example. Said voltage can equally be greater or less than five volts, however.

A comparison voltage UCMP which substantially corresponds to a peak voltage of the divided-down center tap voltage UMAP drops across the discharging resistor R3 and the smoothing capacitor C2. The monitoring unit 14 comprises a comparator COMP whose inverting input is coupled to the cathode terminal of the rectifier diode D1. The comparator COMP is thus supplied with the comparison voltage UCMP. Additionally provided is a further voltage divider comprising a first reference voltage resistor R4 and a second reference voltage resistor R5 which are arranged electrically in series and electrically between the second predefined supply potential V2 and the predefined reference potential GND. A tap of the further voltage divider is coupled to a non-inverting input of the comparator COMP. A respective resistance value of the first and second reference voltage resistor R4, R5 is predefined such that a predefined reference voltage UREF in relation to the predefined reference potential GND is present at the non-inverting input of the comparator COMP. Taking into account a division factor of the voltage divider with the first and the second voltage divider resistor R1, R2, the predefined reference voltage UREF represents a predefined threshold value of the center tap voltage UMAP.

Also provided is a feedback resistor R6 which electrically couples the non-inverting input of the comparator COMP to an output of the comparator COMP. In particular when the output of the comparator COMP is what is termed an open-collector output, a pullup resistor R7 can be provided in addition, which pullup resistor couples the output of the comparator COMP to the second predefined supply potential V2. The output of the comparator COMP forms an error output 15 of the monitoring unit 14.

The comparator COMP is embodied for comparing the comparison voltage UCMP with the predefined reference voltage UREF and for generating an output voltage of the error output 15 in relation to the predefined reference potential GND as a function of the comparison voltage UCMP and the predefined reference voltage UREF. In particular the output voltage corresponds to a digital high level if the comparison voltage UCMP is less than the predefined reference voltage UREF, and corresponds to a digital low level if the comparison voltage UCMP is greater than the predefined reference voltage UREF. In the latter case the presence of the low level at the error output 15 can also be designated as a fault signal. The output voltage, the levels and/or the fault signal can also be predefined differently, however.

For example, during an operation of the apparatus 1 without the short-circuit K, the center tap voltage UMAP lies approximately in an order of magnitude of e.g. 700 mV in relation to the minimum and maximum of the center tap voltage UMAP within an oscillation period if the symmetry error of the signal to be transmitted only amounts to approx. one percent. A symmetry error of this kind can generally be tolerated and possibly is also unavoidable owing to tolerances. If, however, the short-circuit K is present, the potential at the center tap 13 is shifted in relation to the predefined reference potential GND, with the result that the center tap voltage UMAP amounts, for example, to approx. 70 V in relation to the minimum and maximum of the center tap voltage UMAP within an oscillation period. The comparison voltage UCMP is then also greater by a corresponding factor, said comparison voltage then being greater than the predefined reference voltage UREF given suitable dimensioning of the voltage divider and the further voltage divider. In this way the loss of symmetry of the signal in relation to the predefined reference potential GND and accordingly also the short-circuit K can be easily and reliably detected.

It is advantageous that the center tap 13 is coupled to the predefined reference potential GND via the first and second voltage divider resistor R1, R2. A sum of the resistance values of the first and second voltage divider resistor R1, R2 lies in the region of approx. 100 kilohms, for example. However, the sum of the resistance values can also be less than or greater than 100 kilohms. In this way unilaterally acting parasitic capacitances, which is to say parasitic capacitances acting substantially either on the first line 2 or on the second line 3, can be discharged via the first and second voltage divider resistor R1, R2 to the predefined reference potential GND, with the result that the symmetry of the signal transmitted via the first and second line 2, 3 remains permanently preserved if no fault is present. Furthermore, if the short-circuit K is present, the affected half of the secondary winding 12 is subjected to only a slight additional load due to a current flowing through the first and second voltage divider resistor R1, R2, such that the apparatus 1 and the load 4 can continue to be operated reliably without loss of their function.

The apparatus 1 can also be embodied differently. In particular, a different oscillator unit and/or a different balancing unit can be provided. Instead of balancing the differential signal that is to be transmitted or received by means of the transformer 10, said signal can also be balanced for example by means of a balancing voltage divider which comprises at least two resistors or semiconductor components, between which the center tap 13 is electrically arranged. Furthermore, the monitoring unit 14 can also be embodied differently.

The invention claimed is:

1. An apparatus which can be coupled to at least two lines for transmitting a differential signal and/or for receiving a differential signal, wherein the differential signal is an alternating signal alternating substantially symmetrically about a predefined reference potential, the apparatus comprising:
    a balancing unit connectible to the at least two lines, said balancing unit having a center tap; and
    a monitoring unit having an input connected to said center tap, said monitoring unit being configured to monitor a center tap voltage between said center tap and the predefined reference potential and to detect a fault if the center tap voltage is greater than a predefined threshold value, said monitoring unit further including:
    a voltage divider electrically connected between said center tap and the predefined reference potential;
    a rectifier connected to said voltage divider; and
    a comparator having an input connected to said rectifier and an output, said comparator being configured to compare a divided-down and rectified center tap voltage with a reference voltage representing the predefined threshold value and to output an error signal indicating the fault.

2. The apparatus according to claim 1, which comprises at least one resistor electrically coupling said center tap to the predefined reference potential.

* * * * *